United States Patent [19]

Arakawa

[11] Patent Number: 5,751,947
[45] Date of Patent: May 12, 1998

[54] MAGNETIC DISK APPARATUS HAVING INSPECTION FUNCTION OF RECORDING MEDIUM AND METHOD OF INSPECTING RECORDING MEDIUM IN MAGNETIC DISK APPARATUS

[75] Inventor: Yutaka Arakawa, Tokyo, Japan

[73] Assignee: Kabushiki Kaisha Toshiba, Kawasaki, Japan

[21] Appl. No.: 530,477

[22] Filed: Sep. 19, 1995

[30] Foreign Application Priority Data

Apr. 26, 1995 [JP] Japan ................................ 7-102200

[51] Int. Cl.$^6$ ................................................ G11B 20/00
[52] U.S. Cl. ................................................ 395/185.07
[58] Field of Search ........................ 324/158.1; 360/31;
364/550, 551.01, 481, 245.3, 245.9, 264.6,
264.7, 265.3, 267.4, 267.6, 970.1; 371/67.1,
10.2; 395/185.07, 182.06, 183.01

[56] References Cited

U.S. PATENT DOCUMENTS

| | | | |
|---|---|---|---|
| 3,717,846 | 2/1973 | Kanda et al. | 340/141.1 |
| 4,053,751 | 10/1977 | Ault | 235/302.3 |
| 4,942,609 | 7/1990 | Meyer | 360/25 |
| 5,047,874 | 9/1991 | Yomtoubian | 360/25 |
| 5,150,050 | 9/1992 | Genheimer et al. | 324/212 |
| 5,212,677 | 5/1993 | Shimote et al. | 369/58 |
| 5,247,254 | 9/1993 | Huber et al. | |
| 5,297,148 | 3/1994 | Harari et al. | 371/10.2 |
| 5,313,585 | 5/1994 | Jeffries et al. | 395/275 |
| 5,313,626 | 5/1994 | Jones et al. | 395/575 |
| 5,410,439 | 4/1995 | Egbert et al. | 360/75 |
| 5,535,328 | 7/1996 | Harari et al. | 395/182.05 |
| 5,602,987 | 2/1997 | Harari et al. | 395/182.06 |

FOREIGN PATENT DOCUMENTS

| | | | |
|---|---|---|---|
| 4286781 | 10/1992 | Japan | G11B 20/18 |
| 574059 | 3/1993 | Japan | G11B 20/18 |

Primary Examiner—Robert W. Beausoliel, Jr.
Assistant Examiner—Stephen C. Elmore
Attorney, Agent, or Firm—Finnegan, Henderson, Farabow, Garrett & Dunner, L.L.P.

[57] ABSTRACT

When the idling state of a magnetic disk apparatus is detected by a CPU, a timer is started to measure a time started from the start of the idling state. When a predetermined time has elapsed, an error detection circuit performs a defect inspection of a magnetic disk from an access address stored in an EEPROM. When the defect in the magnetic disk is detected, the CPU refers to a table in the ROM to check a defect level. Substitute processing is performed to an area having the defect on the basis of the defect level. A host system is notified of the defect level depending on the defect level.

18 Claims, 4 Drawing Sheets

MAGNETIC DISK APPARATUS HAVING INSPECTION FUNCTION OF RECORDING MEDIUM AND METHOD OF INSPECTING RECORDING MEDIUM IN MAGNETIC DISK APPARATUS

BACKGROUND OF THE INVENTION

1. Field of the Invention

The present invention relates to a magnetic disk system for reading/writing data from/in a magnetic disk serving as a recording medium in response to a command sent from a host system and, more particularly, to a magnetic disk apparatus having an inspection function of detecting a defect in a magnetic disk and a method of inspecting a recording medium in the magnetic disk apparatus.

2. Description of the Related Art

In a magnetic disk apparatus, desired data is generally recorded by magnetizing the surface of a fixed disk. The disk used in the magnetic disk apparatus inevitably has a rough disk surface and an ununiform magnetic material to some extent. A manufacturer of magnetic disk apparatuses must manufacture the magnetic disk apparatuses in consideration of such defects.

In order to normally use a magnetic disk having such defects, processing for restoring a defect is performed when the defect is detected. As this defect restoration processing, substitute processing (reassignment of defecting block) is generally performed. According to this substitute processing, an area in which a defect is detected is assigned to a spare area formed on the same circumference in advance. On the magnetic disk, sectors serving as minimum units to which disk access is performed are formed. Each sector is constituted by an ID portion (header) for storing ID data for identifying the corresponding sector, a data portion for storing data, and an error code portion having an error code for error correction. In the substitute processing, data representing that a sector has a defect is written in the ID portion of a sector in which a defect is detected to prevent the sector from being used. In addition, information representing the position of the sector having the defect is stored on the magnetic disk or in a predetermined memory in the magnetic disk apparatus, so as to substitute access to the sector having the defect for access to a sector in the spare area formed on the same circumference in advance. Note that the substitute processing may be performed in units of tracks depending on the state of a detected defect.

Such substitute processing is performed immediately before a magnetic disk apparatus is shipped or when the magnetic disk apparatus is used by a user.

More specifically, a manufacturer of magnetic disk apparatuses performs a predetermined inspection to complete the magnetic disk apparatuses, and the substitute processing is performed when a defect is detected.

In addition, when a magnetic disk apparatus is connected to a host computer (host system) to perform various data processing, a defect is detected, and it is determined that the defect must be restored. In this case, the substitute processing is performed in the magnetic disk apparatus in response to a specific command issued from the host computer.

In a general magnetic disk apparatus, when initialization processing of a magnetic disk is to be performed, or when read or write processing of data is to be performed, generation of a data error is detected. In the magnetic disk apparatus, a defect on the magnetic disk is detected in response to the generation of the data error.

However, in the above-mentioned magnetic disk apparatus, the following problems are posed when the defect on the magnetic disk is detected.

A data error is generally generated when processing corresponding to a read command or write command sent from a host computer. In the magnetic disk apparatus, when the data error is generated, it is determined on the basis of the state of the data error whether the host computer is notified of the generation of the data error (determination of defect level). When the host computer is notified of the generation of the data error, the following methods are available. In the first method, after the host computer is notified of the generation of the data error, the magnetic disk apparatus waits for a specific command, sent from the host computer, for indicating the start of the substitute processing, the magnetic disk apparatus performs the substitute processing in response to the reception of the specific command. According to the second method, after the host computer is notified of the generation of the data error, the substitute processing is automatically performed in the magnetic disk apparatus.

In either of these methods, as described above, the substitute processing for restoring a defect is performed according to processing corresponding to the command from the host computer. For this reason, while the processing corresponding to the command and the substitute processing are performed, the host computer must wait to issue the next command. Therefore, an exchange of data/command between the host computer and the magnetic disk apparatus is delayed, and data processing efficiency is degraded. More specifically, when the magnetic disk apparatus performs the substitute processing in response to the specific command sent from the host computer, a processing time is excessively required to issue the specific command in the host computer.

In the host computer connected to the magnetic disk apparatus, error management processing corresponding to the generation of a data error must be performed, and, when the specific command must be issued, programs associated with the issue of the command must be stored and managed. For this reason, the host computer is heavily loaded.

In addition, in a magnetic disk apparatus which has decreased in size and increased in density in recent years, error correction processing in the magnetic disk apparatus is an essential function. This error correction processing is performed by an error code stored in the error code portion described above, and generally performed by ECC (error check and correction) using a Hamming code. In the magnetic disk apparatus, when the error correction processing is performed, data stored in the magnetic disk can be normally read/written, but the host computer is not notified that the error correction processing is performed. For this reason, any problem is not posed when the data is restored by the error correction processing. However, when a signal level becomes high because of a progressive defect, and it may be impossible to read/write data. In this case, since the data stored in the magnetic disk cannot be restored, the data stored in the magnetic disk is lost.

In recent years, a function called an S.M.A.R.T. has attracted the attention of makers for manufacturing hard disks and the like. This S.M.A.R.T. is the abbreviation of a Self Monitoring, Analysis and Reporting Technology, and indicates an exchange of data/command between the magnetic disk apparatus and the host computer, such as warning processing, corresponding to the substitute processing performed to the host computer in the magnetic disk apparatus. However, such processing is independently performed between the magnetic disk apparatus and the host computer, the user of the host computer or the magnetic disk apparatus is not notified of information except for information of which the user is not notified in advance, e.g., a warning caused by a high defect level. That is, the function called the S.M.A.R.T. is invisibly performed. Therefore, in recent years, a magnetic disk apparatus in which the S.M.A.R.T. is realized is demanded.

SUMMARY OF THE INVENTION

It is an object of the present invention to provide a magnetic disk apparatus capable of improving the efficiency of an exchange of data/command between the magnetic disk apparatus and a host computer connected thereto to improve data processing efficiency and to improve the reliability of the magnetic disk apparatus, and a method of inspecting a recording medium in a magnetic disk apparatus.

According to the first aspect of the present invention, there is provided a magnetic disk apparatus connected to a host system, comprising: a magnetic disk; a magnetic head; means for performing write/read processing of information at a predetermined position on the magnetic disk by using the magnetic head in response to a command from the host system; a timer for notifying that a predetermined time is elapsed from when the write/read processing is completed; readout means for accessing the magnetic disk to read out information; and inspection means sequentially reading the information from the magnetic disk by using the readout means in response to a notification from the timer, and checking whether the information is properly read out.

The inspection unit includes a unit for performing substitute processing for assigning an area accessed by the readout unit to a substitute area when it is determined that information is not properly read out by the readout unit.

The inspection unit has an interrupt unit for interrupting the inspection processing in response to the command sent from the host system, and a storage unit for storing an access address during the interruption in response to the interruption of the inspection processing caused by the interrupt unit.

The inspection unit has a formation unit for forming defect address information on the magnetic disk using the access address on the magnetic disk accessed by the readout unit when it is determined that information is not properly read out by the readout unit.

In an invention according to the first aspect, when the host system issues no command to the magnetic disk apparatus, or when processing corresponding to the issued command is completed, an inspection for detecting a data error, i.e., a defect in the magnetic disk, is performed. In this manner, a portion of the disk where data may be lost due to a progressive defect, or the like, in future can be detected in advance, and the reliability of the magnetic disk apparatus can be improved.

In the magnetic disk apparatus, when the host system issues no command to the magnetic disk apparatus, or when processing corresponding to the issued command is completed, the substitute processing is performed in accordance with a detected defect. In this manner, the substitute processing can be performed without heavily loading the host system connected to the magnetic disk apparatus. In addition, an exchange of data/command between the magnetic disk apparatus and the host computer can be efficiently performed.

In the magnetic disk apparatus, when inspection processing of the magnetic disk is interrupted in response to a command from the host computer, a specific portion, on the magnetic disk, to which an inspection is performed can be recognized.

In the magnetic disk apparatus, since information associated with a defect on the magnetic disk is formed, the condition of the magnetic disk to be used can be managed.

According to the second aspect of the present invention, there is provided a magnetic disk apparatus connected to a host system, comprising: a plurality of magnetic disks; means for positioning a magnetic head at an arbitrary position on each of the magnetic disk to perform write/read processing of data; idling detection means for detecting an idling state of the magnetic disk apparatus; a nonvolatile memory for storing an address on the magnetic disk; defect detection means for, when the idling state of the magnetic disk apparatus is detected by the idling detection means, sequentially detecting the presence/absence of defects in the plurality of magnetic disks in units of bits from the address stored in the nonvolatile memory; substitute processing means for performing processing in which, when a defect is detected by the defect detection means, and a level of the defect is checked, an area corresponding to a detected defect having a level higher than a predetermined level is assigned to a substitute area; and interrupt means for interrupting the defect detection means in response to a command from the host system to store an address during interruption in the nonvolatile memory.

According to the third aspect of the present invention, there is provided an inspection method in a magnetic disk apparatus connected to a host system and having a plurality of magnetic disks, means for positioning a magnetic head at an arbitrary position on each of the magnetic disks to perform write/read processing of data, and a nonvolatile memory for storing an address on the magnetic disk, comprising the steps of: a) detecting an idling state of the magnetic disk apparatus; b) when the idling state of the magnetic disk apparatus is detected in the step a), sequentially detecting the presence/absence of defects in the plurality of magnetic disks in units of bits from the address stored in the nonvolatile memory; c) when a defect is detected in the step b), checking a level of the defect and assigning an area corresponding to a detected defect having a level higher than a predetermined level to a substitute area; and d) interrupting the step b) in response to a command from the host system to store an address during interruption in the nonvolatile memory.

The inspection unit monitors detect address information every magnetic disk, and outputs a warning message or warning signal to the host system when the number of defects detected on an arbitrary magnetic disk exceeds a predetermined number.

In an invention according to the second aspect, in the magnetic disk apparatus, in an idling state wherein processing corresponding to a command sent from the host system or look-ahead processing using a cache is not performed, the presence/absence of a defect on the magnetic disk is checked in units of bits. When a defect on the magnetic disk is detected, the level of the defect is checked, the substitute processing is performed to the defect having a level equal to or higher than a predetermined level. Even if the defect inspection processing is interrupted in response to a command sent from the host system, an address during the interruption is stored in a nonvolatile memory. When the magnetic disk apparatus is set in an idling state again, the defect inspection processing of the magnetic disk is restarted.

In addition, when a predetermined number or more defects are detect, and this situation is repeated, the inspection unit outputs a warning signal to the host system. In this manner, the conditions of an arbitrary magnetic disk and a magnetic head corresponding to the magnetic disk can be determined. Therefore, the host system can be notified of a hindrance in advance of every magnetic disk or magnetic head.

In the magnetic disk apparatus, after the inspection is finished, the ratio of the number of inspected blocks to the number of abnormal blocks is calculated. A predetermined number of past calculated ratios are stored in the magnetic disk apparatus. A rate of defect formation is monitored on the basis of the stored values. When the rate exceeds a predetermined value, it is determined that the number of defects increases due to some abnormality, and a warning message or an warning signal is output to the host system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

An embodiment according to the present invention will be described below with reference to the accompanying drawings.

Figure 1:
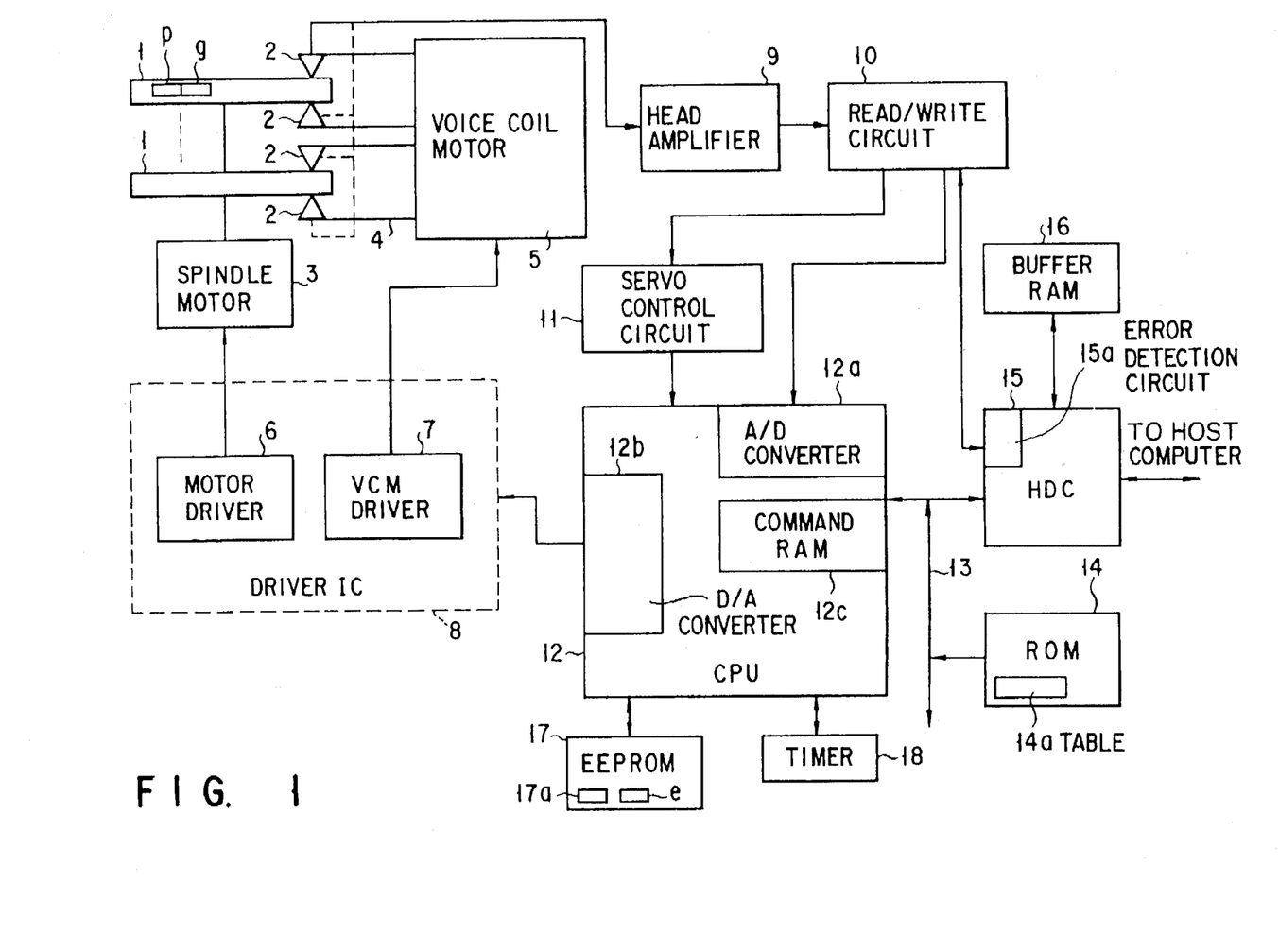
FIG. 1 is a block diagram showing the arrangement of a magnetic disk apparatus according to an embodiment of the present invention.

The entire arrangement of a magnetic disk system according to the present invention is shown in FIG. 1. As shown in FIG. 1, in the magnetic disk system, a plurality of (or one) magnetic disks 1 are rotated at a high speed by a spindle motor 3, and a plurality of magnetic heads 2 are arranged opposite to the data surfaces of the magnetic disks 1. When one magnetic disk 1 is used, two heads 2 are arranged opposite to both the surfaces of the magnetic disk 1. The magnetic heads 2 are attached to head moving mechanisms called carriages 4, and the magnetic heads 2 move in the radial direction of the magnetic disk 1 in accordance with the pivotal motion of the carriages 4. The magnetic heads 2 are controlled to be positioned on a designated target cylinder (target track) by a servo processing system (head positioning control mechanism) (to be described later). The magnetic heads 2 generally read/write data in units of sectors. Various data and pieces of defect information p and g associated with defects on the magnetic disk 1 are stored in the magnetic disk 1. The defect information p is registered by a manufacturer during the manufacture of the magnetic disk 1, and the defect information g is the information of a defect detected in use of the magnetic disk system and managed by a host computer. It is assumed that the defects registered in the pieces of defect information p and g are subjected to substitute processing in advance.

The carriages 4 are driven by a voice coil motor (VCM) 5. The VCM 5 is driven by a VCM driver 7. The spindle motor 3 is driven by a motor driver 6. In this embodiment, the motor driver 6 and the VCM driver 7 are integrally constituted as a driver IC (integrated circuit) 8 called a double driver.

A read/write circuit 10 receives a read signal amplified by a head amplifier 9 and obtained from the magnetic heads 2 to perform signal processing required for a data reproducing operation. The read/write circuit 10 performs signal processing required for a data recording operation and supplies a write current corresponding to write data to the magnetic heads 2 through the head amplifier 9.

The read/write circuit 10 performs recording/reproducing processing of normal user data and reproducing processing of servo data required for servo processing of head positioning control. The servo data includes cylinder addresses representing the current positions of the magnetic heads 2 and burst data (burst signal) for representing a positional error in a cylinder. A servo control circuit 11 performs signal processing required for the servo processing, and extracts a cylinder address from data pulse output from the read/write circuit 10 to hold the cylinder address. The servo control circuit 11 outputs a sample timing signal for extracting a burst signal and performs sector pulse extraction processing.

A CPU 12 and the servo control circuit 11 constitute a servo processing system which performs the heat positioning control. In addition, the CPU 12 performs not only the head positioning control but also various drive control of the magnetic disk system including transfer control of read/write data. The CPU 12 performs the various drive control on the basis of a control program stored in a ROM 14. The ROM 14 is connected to the CPU 12 through an external bus 13. A Table 14a stores various programs for a defect inspection in the idling state of the magnetic disk system and a level determination of defects are stored in the ROM 14. The definition of a defect level based on conditions such as a variation in output level of data, the number of times of repeated read processing (the number of times of retry), and proper readout of data by an error correction function such as ECC.

The CPU 12 is a one-chip microprocessor, that includes an A/D converter 12a and a D/A converter 12b as input/output units, and has an internal read/write memory called a command RAM (Random Access Memory) 12c. In this embodiment, the command RAM 12c has a capacity of 2k bytes. The CPU 12 uses the A/D converter 12a to convert a supplied burst signal BS into a digital signal. The CPU 12 uses the D/A converter 12b to convert a control amount (control amount required for the head positioning control or the like) required for the servo processing into an analog signal and output it to the driver IC 8.

An HDC 15 is a controller which constitutes an interface between the HDD and the host computer and mainly transfers read/write data. The HDC 15 temporarily stores, in a buffer RAM 16, read data read from the magnetic disk 1 in units of sectors and write data to be written in the magnetic disk 1. The HDC 15 and the CPU 12 constitute a system for performing data transfer control. An error detection circuit 15a is arranged in the HDC 15. The error detection circuit 15a detects a data error on the basis of data read from the magnetic disk 1 and has a function of correcting an error in a predetermined small area.

An EEPROM 17 is connected to the CPU 12 and stores various data. In particular, in this embodiment, the EEPROM 17 stores defect information e associated with a defect of the magnetic disk 1. When a defect inspection of the magnetic disk 1 is interrupted, the CPU 12 writes access information 17a during the interruption in the EEPROM 17. This access information 17a is an address represented by a head, a cylinder, and a sector.

A timer 18 is connected to the CPU 12, and measures a time elapsed from when the magnetic disk system set in an idling state under the control of the CPU 12. When a predetermined time is elapsed, the CPU 12 is notified that the predetermined time is elapsed.

Figure 2:
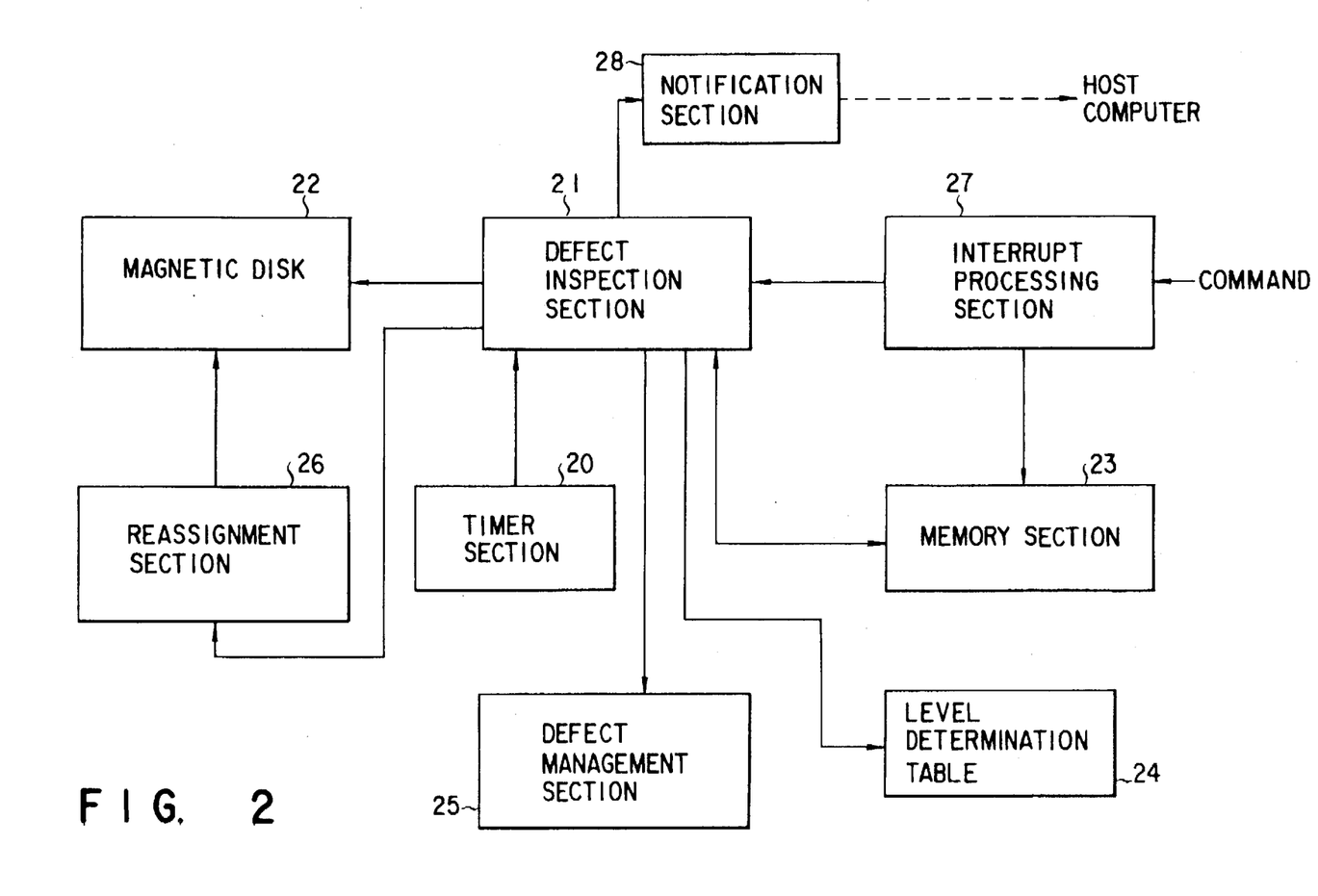
FIG. 2 is a functional block diagram showing the functional arrangement of the magnetic disk apparatus shown in FIG. 1.

A functional block diagram of the magnetic disk system according to this embodiment is shown in FIG. 2.

A timer unit 21 detects the idling state of the magnetic disk system. When a predetermined time is elapsed from when the idling state is started, a defect inspection unit 21 is notified that the predetermined time is elapsed. In this case, the idling state means a state wherein communication between the magnetic disk system and the host computer connected thereto is not performed, e.g., a state wherein processing such as read processing or write processing corresponding to a command sent from the host computer is not performed. Note that when the magnetic disk system has a cache for look-ahead processing corresponding to a read command, the idling state means a state wherein the look-ahead processing using this cache is not performed.

The defect inspection unit 21 has an error detection function and an error correction function using ECC or the like, and performs defect inspection processing of a magnetic disk 22 in response to a notification from the timer unit 20. In this defect inspection processing, data stored in the magnetic disk 22 is read out to detect a defect in units of bits, and the state of the detected defect is determined. The defect inspection unit 21 starts the defect inspection processing from an address stored in a memory unit 23.

The defect inspection unit 21 performs error correction processing to the detected defect, and determines the level of the detected defect with reference to a level determination table 23. In this case, a substitute processing unit 26 is notified of the position of the defect determined as a high-level error. The substitute processing unit 26, in response to the notification, performs substitute processing which substitutes a predetermined area, e.g., sector, in which the defect is located for a substitute area set on the magnetic disk 22 in advance. When it is determined that the detected defect is not a high-level error, the defect inspection unit 21 sends defect information such as the position and level of the defect to a defect list formation unit 25. The defect management unit 25 manages the number of generated error or the like as a list such as table format on the basis of the received defect information. The defect inspection unit 21 calculates a defect formation rate, and checks on the basis of a several number of past data stored in the memory unit 23 whether the number of defects increases or whether the number of detected defects exceeds a predetermined number. When a defect which is a high-level error is detected, when the number of defects increases, or when the number of defects exceeds the predetermined number, a notification unit 28 is notified of these states.

The level of a defect (to be referred to as a defect level hereinafter) is a standard representing the state of a defect determined on the basis of conditions such as a variation in output level of data output from the magnetic disk 22, the number of times of read processing (the number of times of retry) repeated when data is read out by a series of read processing, and proper readout of data by an error correction function such as ECC. Information associated with a determination processing reference of the defect level is stored in the level determination table 24.

An interrupt processing unit 27 detects reception of a command sent from the host computer during the defect inspection processing performed by the defect inspection unit 21, and instructs the defect inspection processing to be interrupted in response to the reception of the command. More specifically, an interrupt signal is output to the defect inspection unit 21 such that the defect inspection processing is interrupted in response to the reception of the command to make it possible to perform processing corresponding to the received command in the magnetic disk system. Information representing a position, on the magnetic disk 22, to which the interrupted defect inspection processing is performed is stored in the nonvolatile memory unit 23.

The notification unit 28 notifies/warns the host computer of various information depending on the level of the defect detected by the defect inspection unit, an increase in defect formation rate, or the number of defects which is larger than a threshold value. In this case, the host computer can be warned of a corresponding error code.

An operation of this embodiment will be described below with reference to the flow charts shown in FIGS. 2, 3, and 4.

Figure 3:
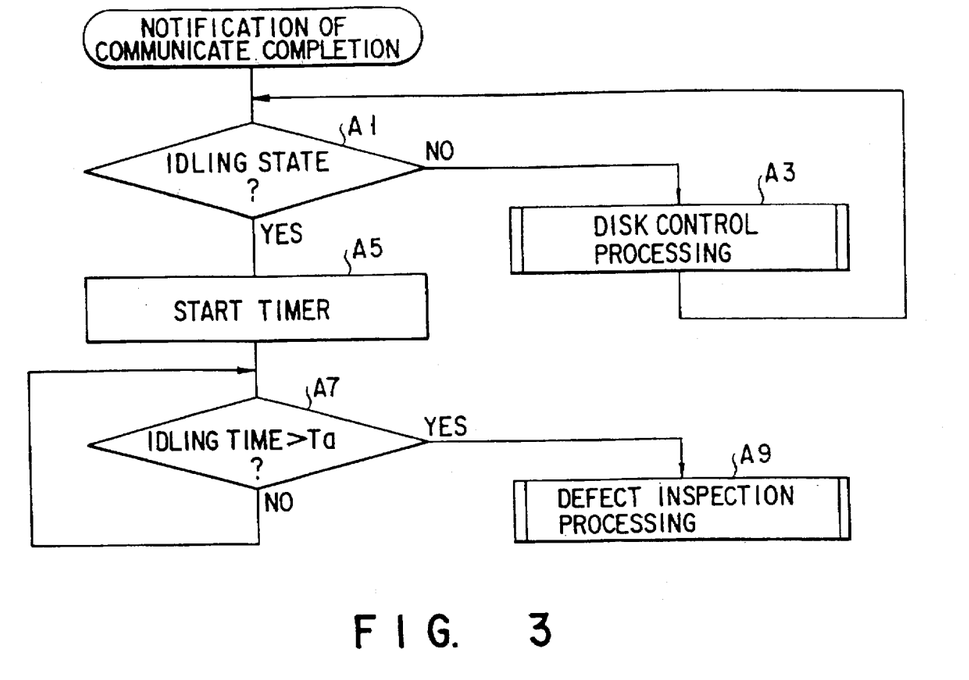
FIG. 3 is a flow chart for explaining conditions under which defect inspection processing is performed in the magnetic disk apparatus shown in FIG. 1.
Figure 4:
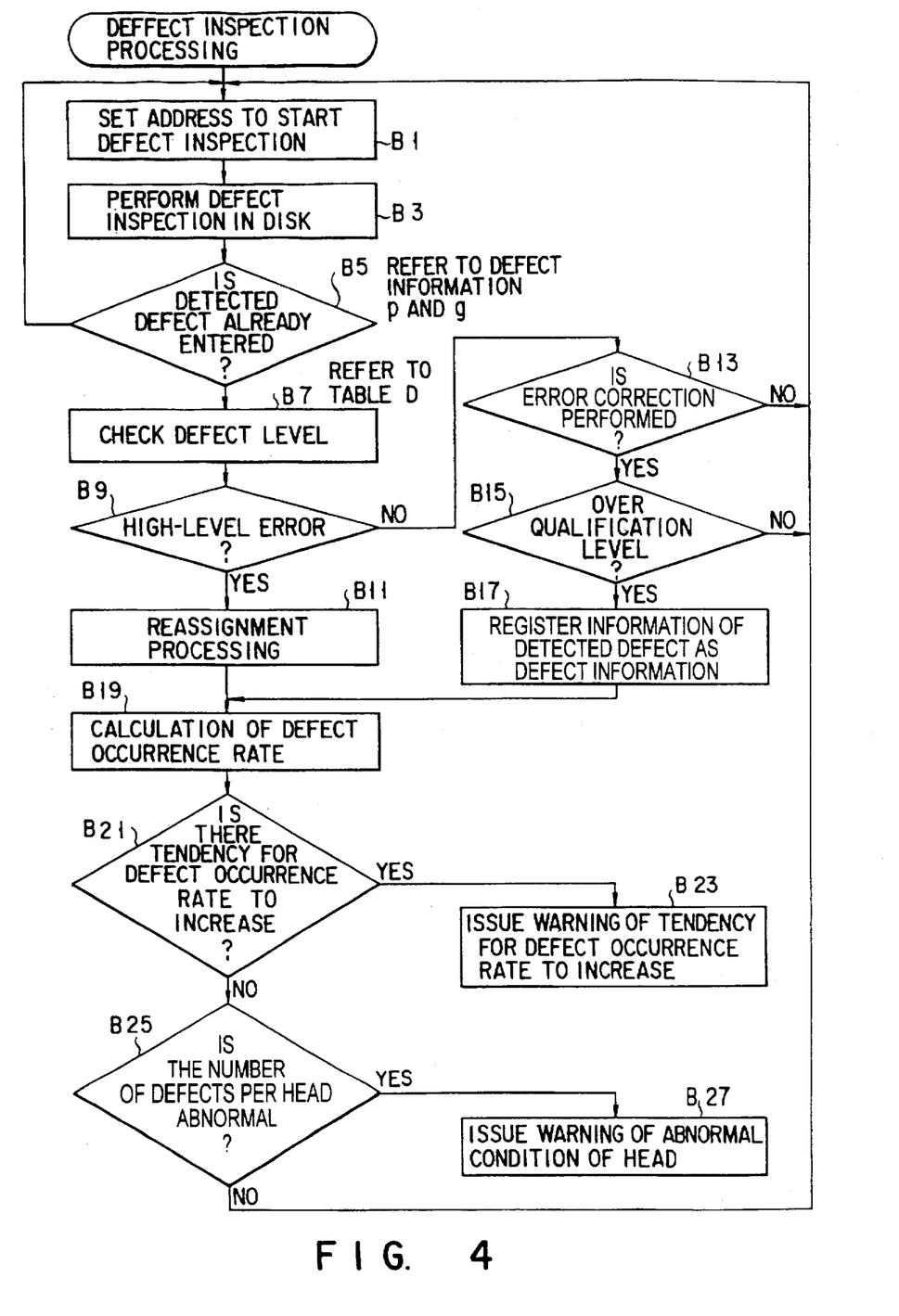
FIG. 4 is a flow chart for explaining conditions under which defect inspection processing and defect warning processing are performed in the magnetic disk apparatus shown in FIG. 1.

An operation performed until defect inspection processing is performed in the magnetic disk system of this embodiment is shown in FIG. 3. When the hard disk controller (HDC) 15 outputs a communication completion notification to the CPU 12 when communication processing including reception of a command from the host computer and transmission of data to the host computer is completed. The CPU 12 checks, on the basis of the communication completion notification, whether the magnetic disk system is set in an idling state (step A1). In this case, if it is determined that the magnetic disk system is set in the idling state, the magnetic disk system is performing disk control processing corresponding to a command previously received from the host computer, e.g., data write processing or the like for the magnetic disk 1 (step A3). Therefore, in response to the completion of the disk control processing, it is determined that the magnetic disk system is set in the idling state (YES in step A1).

If it is determined that the magnetic disk system is set in the idling state, the CPU 12 starts the timer 18. In this manner, a time elapsed from the start of the idling state is measured by the timer 18. When a predetermined time Ta elapsed from the start of the idling state, the timer 18 notifies the CPU 12 that the predetermined time is elapsed (YES in step A7). Note that, when a command is sent from the host computer to the HDC 15 while the predetermined time Ta is measured by the timer 18, the time measurement performed by the timer 18 is interrupted, and processing corresponding to the received command is performed.

The CPU 12 performs defect inspection processing of the magnetic disk 1 in response to a notification from the timer 18 (step A9).

Defect inspection processing and warning processing caused by formation of a defect will be described below with reference to FIG. 4.

The CPU 12 uses the error detection circuit 15a of the HDC 15 to perform the defect inspection processing. The CPU 12 reads out the access address 17a stored in the EEPROM 17 and controls the various drivers to position each magnetic head 2 at the read access address (step B1). Thereafter, the magnetic disk is sequentially inspected for a defect in units of bits from the access address (step B3). In this case, the presence/absence of a defect is checked by checking whether data can be properly read from the magnetic disk 1, i.e., whether a data error is generated. In the defect inspection, if necessary, error correction processing is performed by the error detection circuit 15a, or error correction treatment is performed by using ECC. When a defect is detected in the magnetic disk 1, the CPU 12 refers to the pieces of defect information p and g stored in the magnetic disk 1 to check whether the detected defect is a defect which is registered in advance (step B5). In this case, when the defect is registered in the pieces of defect information p and g (YES in step B5), the substitute processing is performed for the defect. For this reason, the flow returns to steps BI and B3 to perform the defection inspection again from the address next to the address at which the defect is detected.

When the detected defect is not registered in the pieces of defect information p and g, the CPU 12 refers to the table 14a stored in the ROM 14 to determine a defect level (step B7). As described above, the table 14a stores determination standards based on the conditions such as a variation in output level of the read data, the number of times of read processing (the number of times of retry) repeated when data is read out by a series of read processing, and proper readout of data by an error correction function such as ECC.

The substitute processing is performed for a defect having a level which is determined as a high level in the above determination (YES in step B9, and step B11). Defect information associated with the defect to which the substitute processing is performed is additionally registered in the defect information g stored in the magnetic disk 1.

If the defect level is not determined as a high level in the above determination (NO in step B9), it is checked whether error correction processing using the error detection circuit 15a or ECC is performed during the defect inspection (step B13). In addition, if the error correction processing is performed, it is checked whether the defect level exceeds a predetermined threshold value in the performed error correction processing (step B15). In this case, the threshold value represents the number of times of retry of read processing performed to read data and a level at which generation of an error cannot be neglected. If the error correction processing is not performed (NO in step B13), or if the defect level does not exceed the threshold value in the performed error correction processing (NO in step B15), the flow of the CPU 12 returns to steps B1 and B3 to perform a defect inspection again from the address next to the address at which the defect is detected.

If the defect level exceeds the predetermined threshold value in the error correction processing performed to the detected defect (YES in step B15), information (the number of times of retry or the like) associated with the detected defect is additionally stored in the defect information e of the EEPROM 17. The defect of information registered in the defect information e has a defect level lower than the defect registered in the defect information p or g, and does not make it impossible to read data. However, when the defect is progressive, in the future the defect may become a defect which makes it impossible to read data. Therefore, when a defect, having a level higher than the predetermined threshold value, to which the error correction processing must be performed is managed in the defect information e, a defect which may become a high-level defect in future can be managed.

After the information associated with the detected defect is registered in the defect information e, or after the substitute processing is performed, i.e., after step B11 or B17, the CPU 12 calculates a defect formation rate and stores the result in the EEPROM 17 (step B19). The EEPROM 17 is designed to store calculation results obtained by a several number of past calculations (a predetermined number of past calculations). The formation rate is calculated each time the magnetic disk system is set in an idling state, i.e., an inspection for defects is performed. For example, the formation rate is calculated by:

the number of defects/the number of inspected blocks in %. The CPU 12 compares the calculated defect formation rate with a several number of past formation rates stored in the EEPROM 17 to check whether the number of defects increases (step B21). If the CPU 12 determines that the number of defects increases, the CPU 12 notifies/warns the host computer that the number of defects increases (step B23). More specifically, when the number of defects increases, an abnormality may occur in the future. For example, the magnetic head 2 is brought into contact with the magnetic disk 1 (head crash), a window margin is not assured in the magnetic disk system for a predetermined period of time, and cracks on the magnetic disk 1 increase in size. For this reason, the CPU 12 of the magnetic disk system notifies the host computer of that the number of defects increases, and the notified host computer can perform appropriate processing such as processing for notifying a user of abnormality occurrence. Note that the window margin is a period set to read data, and the data cannot be detected at time out of the window margin. The window margin is influenced by the temperature and operation voltage of the magnetic disk system or noise.

If it is determined, on the basis of the calculated defect formation rate, that the number of defects do not increase (NO in step B21), the CPU 12 checks whether the number of defects in each magnetic head 2 is equal to or larger than a predetermined value (step B25). The threshold value used in this case is stored in a nonvolatile memory such as the EEPROM 17 in advance. If it is determined that the number of defects are equal to or larger than the predetermined value in one of the magnetic heads 2, the CPU 12 notifies/warns the host computer of the target magnetic head and that the number of defects are equal to or larger than the predetermined value in the target head (step B27). In this manner, when the number of defects are equal to or larger than the predetermined value in a specific head, for example, the above head crash occurs, the cracks on a media (magnetic disk) increase in size, or the magnetic head scratches the magnetic disk in a seeking operation. In addition, these situations may probably occur. For this reason, the CPU 12 notifies the host computer that the number of defects in each magnetic head is abnormal (the number of the defects is equal to or larger than the threshold value), and the notified host computer can perform appropriate processing such as processing for notifying a user that abnormality associated with the magnetic head occurs.

If it is determined that the number of defects do not increase, and it is determined that the number of defects in each head is not equal to or larger than the predetermined value (NO in step B21, and NO in step B25), the flow of the CPU 12 returns to steps B1 and B3 to perform a defect inspection again from the address next to the address at which the defect is detected.

With the above processing, the defect inspection is performed to the magnetic disk 1, and the substitute processing is performed as needed.

Figure 5:
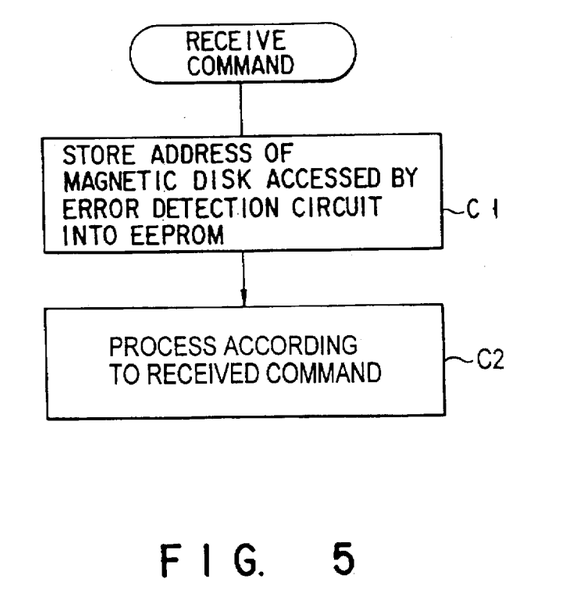
FIG. 5 is a flow chart for explaining interruption of defection inspection processing performed in response to command reception in the magnetic disk apparatus shown in FIG. 1.

Defect inspection interrupt processing performed when the HDC 15 receives a command from the host computer during the defect inspection processing will be described below with reference to FIG. 5. When the HDC 15 receives a command from the host computer, the HDC 15 outputs an interrupt signal representing the reception of a command to the CPU 12. The CPU 12, in response to the interrupt signal, stores an address, e.g., a cylinder, a head, and a sector on the magnetic disk 1 to which the defect inspection, in the EEPROM 17, and then interrupts the defect inspection processing (step C1). Thereafter, the CPU 12 performs processing corresponding to the command received by the HDC 15(step C2).

According to the present invention, when the magnetic disk system is kept set in the idling state for a predetermined time, the defect inspection processing is performed to the magnetic disk. More specifically, while the host computer performs another processing, the defect inspection of the magnetic disk can be performed, a load of the host computer associated with the defect inspection of the magnetic disk can be reduced, and the idling time of the magnetic disk system can be effectively used. In addition, a defect is rarely detected when processing corresponding to the command from the host computer is performed, and the data communication between the magnetic disk system and the host computer can be efficiently performed.

In addition, since a defect which may make it impossible to restore data in future can be detected in advance, the reliability of the magnetic disk system can be improved.

When the host computer connected to the magnetic disk system has a command for instructing the magnetic disk system to perform defect inspection processing to the entire surface of the magnetic disk, this command is removed, and a load of the host computer associated with the command can be reduced.

According to this embodiment, a specific magnetic disk and the situation of a magnetic head corresponding to the specific magnetic disk can be determined on the basis of the address information of a detected defect. In this manner, the specific magnetic disk or the abnormal state of the magnetic head can be detected, and the host computer is notified of the hindrance in advance.

According to this embodiment, a defect formation rate is monitored on the basis of a several number of past inspection results. When the formation rate is not 0 or constant, but increases, it is determined that the number of defects increases due to some abnormality. The host computer can be notified of this situation in advance.

In the above magnetic disk system, the defect information e formed by the defect inspection processing can be designed to be formed during read processing corresponding to a read command from the host computer. In this case, the read processing and the defect inspection processing are simultaneously performed, the defect inspection processing is always performed to an area which is frequently accessed by the host computer, thereby improving reliability related to data maintenance. However, in look-ahead processing following the read command, since the processing performance of the magnetic disk system may be degraded, a defect level determined as a high level and a threshold value used when information is additionally registered in the defect information e must be made higher than those in the above defect inspection processing.

The defect formation rate may be stored in the EEPROM 17 to be related to elapsed time information by using the timer.

The host computer may be notified of a defect and abnormality such that the defect and abnormality correspond to various error codes. In addition, products can be classified by levels such as a level of "usable product having defect" and "useless product".

As has been described above, according to the present invention, when the magnetic disk system is kept set in the idling state for a predetermined time, the defect inspection processing is performed to the magnetic disk. More specifically, while the host computer performs another processing, the defect inspection of the magnetic disk can be performed, a load of the host computer associated with the defect inspection of the magnetic disk can be reduced, and the idling time of the magnetic disk system can be effectively used. In addition, a defect is rarely detected when processing corresponding to the command from the host computer is performed, and the data communication between the magnetic disk system and the host computer can be efficiently performed.

In addition, according to the present invention, a magnetic disk apparatus corresponding to the above S.M.A.R.T. can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk apparatus connected to a host system, comprising:

a plurality of magnetic disks;

means for positioning a magnetic head at an arbitrary position on each said magnetic disk to perform write/read processing of data;

idling detection means for detecting an idling state of said magnetic disk apparatus;

a nonvolatile memory;

defect detection means for, when the idling state of said magnetic disk apparatus is detected by said idling detection means, sequentially detecting the presence/absence of defects in said plurality of magnetic disks in units of bits from the addresses stored in said nonvolatile memory;

substitute processing means for performing processing in which, when a defect is detected by said defect detection means and a defect quantity level is calculated, an area corresponding to a detected defect having a level higher than a predetermined level is assigned to a substitute area;

means for, when the defect is detected by said defect detection means, calculating the defect quantity level and storing a location of the detected defect in said nonvolatile memory as a defect location map when the defect quantity level is lower than or equal to the predetermined level;

means for analyzing locations of the defect in units of at least one of disks and heads by using said defect location map;

means for outputting a warning signal to said host system in accordance with a result of said analyzing means;

means for calculating a formation rate of defects detected by said defect detection means, and storing the defect formation rate in said nonvolatile memory;

determination means for checking, on the basis of the defect formation rate stored in said nonvolatile memory, whether the number of defects increases; and means for outputting a warning signal to said host system when said determination means determines that the number of defects increases.

2. An apparatus according to claim 1, wherein said defect detection means includes:

interrupt means for interrupting sequentially detection by said defect detection means in response to the command sent from said host system, and storage means for storing an access address into said nonvolatile memory during interruption in response to interruption of the sequentially detection caused by said interrupt means.

3. An apparatus according to claim 1, wherein said defect detection means includes:

interrupt means for interrupting sequentially detection by said defect detection means in response to the command sent from said host system: and storage means for storing an access address into an arbitrary magnetic disk of said plurality of magnetic disks during interruption in response to interruption of the sequentially detection caused by said interrupt means.

4. An apparatus according to claim 1, wherein said defect detection means includes formation means for forming defect address information on said magnetic disk by using the access address on said magnetic disk when it is determined that the information is not properly read out.

5. An apparatus according to claim 4, wherein said formation means stores the defect address information in said nonvolatile memory.

6. An apparatus according to claim 4, wherein said formation means stores the defect address information in an arbitrary one magnetic disk of said plurality of magnetic disks.

7. An apparatus according to claim 4, wherein said formation means includes means for, when it is determined that the information is not properly read out and the access address on an accessed one of said magnetic disks is registered in the defect address information, updating information corresponding to the registered access address.

8. A magnetic disk apparatus according to claim 1, further comprising:

interrupt means for interrupting said defect detection means in response to a command from said host system to store an address during interruption in said nonvolatile memory.

9. An apparatus according to claim 1, wherein said substitute processing means includes means for, when the defect quantity level detected by said defect detection means is lower than a predetermined level, forming defect information including a data length of the detected defect and the number of defects.

10. An apparatus according to claim 1, further comprising means for outputting a warning signal to said host system when the number of defects detected by said defect detection means is not lower than a predetermined number.

11. An apparatus according to claim 10, wherein said warning means checks in each of said plurality of disks whether the number of defects detected by said defect detection means is not lower than the predetermined number, and outputs a warning signal to said host system when the number of detected defects is not lower than the predetermined number.

12. An apparatus according to claim 1, wherein the defect quantity level corresponds to a number of retries required to read a data block containing said defects.

13. An inspection method in a magnetic disk apparatus connected to a host system and having a plurality of magnetic disks, means for positioning a magnetic head at an arbitrary position on each of said magnetic disks to perform write/read processing of data, and a nonvolatile memory for storing an address on said magnetic disk, comprising the steps of:

a) detecting an idling state of said magnetic disk apparatus;

b) when the idling state of said magnetic disk apparatus is detected in the step a), sequentially detecting the presence/absence of defects in said plurality of magnetic disks in units of bits from the address stored in said nonvolatile memory;

c) when a defect is detected in the step b), calculating a defect quantity level and assigning an area corresponding to a detected defect having the defect quantity level higher than a predetermined level to a substitute area;

d) interrupting the step b) in response to a command from said host system to store an address during interruption in said nonvolatile memory;

e) when a defect is detected in the step b), calculating the defect quantity level and storing a location of the detected defect in said nonvolatile memory as a defect location map when the defect quantity level detected is lower than or equal to the predetermined level;

f) analyzing locations of the detect in units of at least one of disks and heads by using said defect location map;

g) outputting a warning signal to said host system in accordance with a result of analyzing in the step f);

h) calculating a formation rate of detected defects by said defect detection means, and storing the defect formation rate in said nonvolatile memory;

i) checking, on the basis of the defect formation rate stored in said nonvolatile memory, whether the number of defects increases; and j) outputting a warning signal to said host system when it is determined, in the step g), that the number of defects increases.

14. A method according to claim 13, wherein the step e includes the step of, when the defect quantity level detected in the step b is lower than or equal to the predetermined level, forming defect information including a data length of the detected defect and the number of defects.

15. A method according to claim 13, further comprising the step of:

k) when the number of detected defects in the step b is not lower than a predetermined number, outputting a warning signal to said host system.

16. A method according to claim 15, wherein, in the step k), it is checked, in each magnetic disk of said plurality of magnetic disks, whether the number of detected defects in the step b) is larger than the predetermined number, and outputting the warning signal to said host system when the number of detected defects is not lower than the predetermined number.

17. A method according to claim 13, wherein the step c) of calculating the defect quantity level further include the step of determining the number of retries needed to read the data block containing said defects.

18. A method according to claim 13, wherein the step e) of calculating the defect quantity level further include the step of determining the number of retries needed to read the data block containing said defects.

* * * * *

UNITED STATES PATENT AND TRADEMARK OFFICE
CERTIFICATE OF CORRECTION

PATENT NO. : 5,751,947
DATED : May 12, 1998
INVENTOR(S) : Yutaka ARAKAWA

It is certified that error appears in the above-indentified patent and that said Letters Patent is hereby corrected as shown below:

Claim 3, Col. 13, line 26, "system:" should read --system;--.

Claim 13, Col. 14, line 32, "b)." should read --b),--.

Claim 17, Col. 15, line 5, "include" should read --includes--.

Claim 18, Col. 16, line 2, "include" should read --includes--.

Signed and Sealed this

Tenth Day of August, 1999

Q. TODD DICKINSON

*Attest:*

*Attesting Officer*      *Acting Commissioner of Patents and Trademarks*